United States Patent [19]

Nicholson

[11] 4,206,698
[45] Jun. 10, 1980

[54] BALING APPARATUS

[76] Inventor: John Nicholson, Port Fowey, School Rd., Waltham St. Lawrence, near Reading, Berkshire, England

[21] Appl. No.: 927,864

[22] Filed: Jul. 25, 1978

[30] Foreign Application Priority Data

Jul. 29, 1977 [GB] United Kingdom ............... 31875/77

[51] Int. Cl.² .............................................. B65B 13/18
[52] U.S. Cl. ....................................... 100/17; 56/341; 100/3; 100/33 PB
[58] Field of Search ...................... 56/343, 341; 100/1, 100/3, 17, 33 PB, 7

[56] References Cited

U.S. PATENT DOCUMENTS

| 3,552,109 | 1/1971 | Murray | 56/343 |
| 3,938,432 | 2/1976 | Jones | 100/7 |
| 4,104,853 | 8/1978 | Howard | 56/341 |

FOREIGN PATENT DOCUMENTS 1378139 12/1974 United Kingdom ........................ 100/7

Primary Examiner—Billy J. Wilhite
Attorney, Agent, or Firm—Fay & Sharpe

[57] ABSTRACT

Small bunches of baleable material are formed into self-sustaining tied small bales as the material is fed to a large container. A plurality of the small bales filling the container are tied into a self-sustaining large bale. Untying a large bale from storage produces a plurality of easily handled tied small bales instead of a large mass of loose material.

5 Claims, 17 Drawing Figures

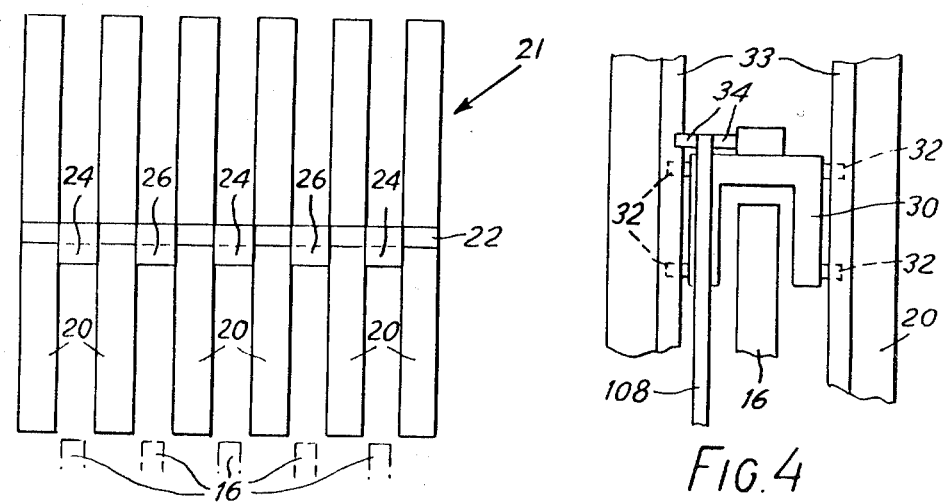
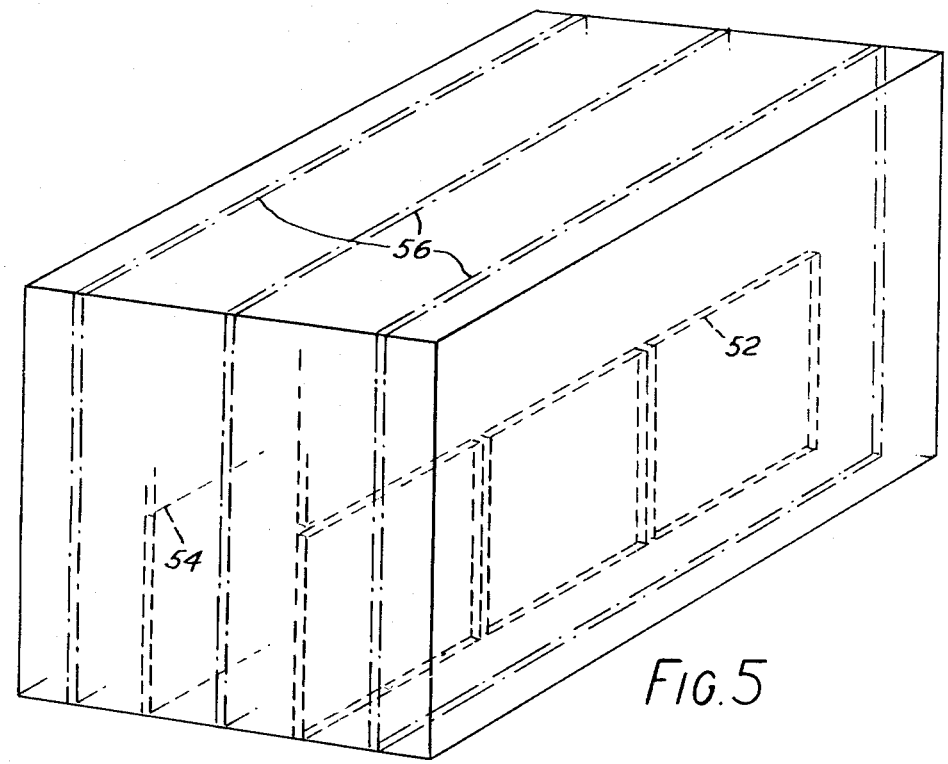

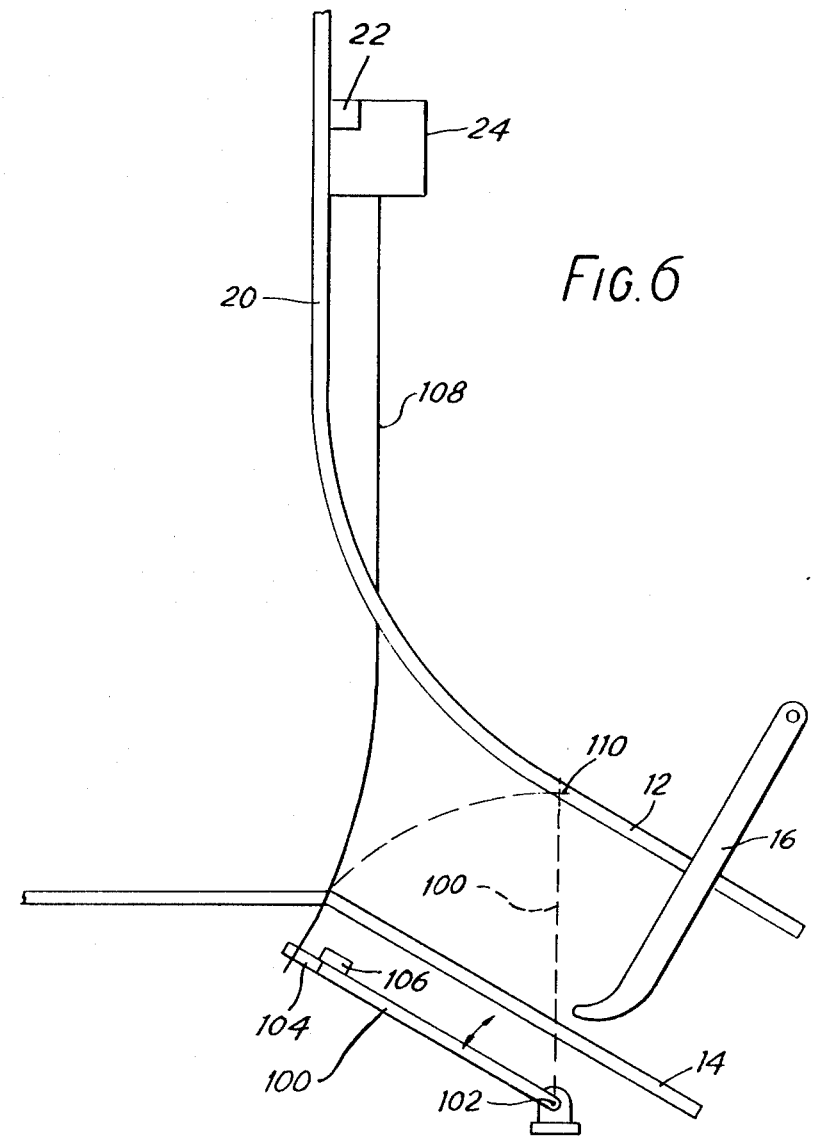

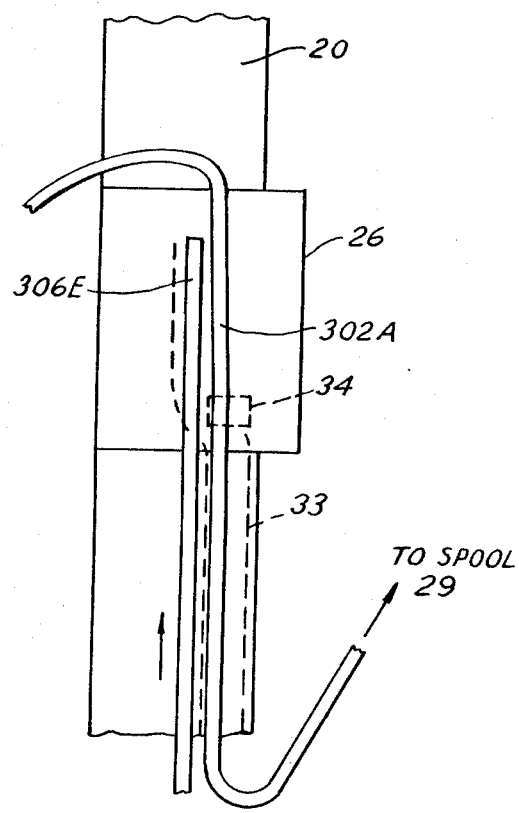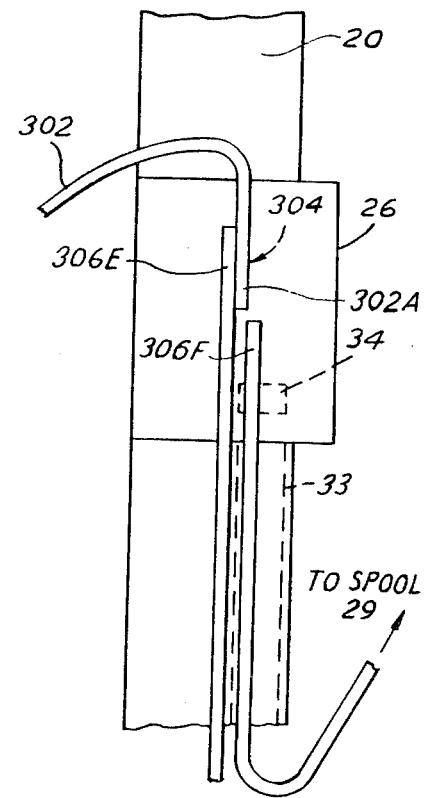

BALING APPARATUS

This invention relates to a baling machine.

In baling operations it has been proposed to form a "big bale" of hay, straw, grass or like above-ground crop and in this context a big bale is considered to be a large volume bale whose dimensions may for example be five feet by five feet by eight feet. Baling apparatus of this type is disclosed in British Pat. Nos. 1,244,302 and 1,244,303 corresponding to U.S. Pat. No. 3,552,109 issued Jan. 5, 1971, to Murray et al. A large volume bale is thus distinguished from a conventional size bale, which is, for example, about two feet by two feet by three feet and can be moved by one or two men. It will be appreciated that a big bale, weighing for example around one half a ton, cannot be so moved and it is a factor inhibiting use of big bales, which have many economic advantages, that when the crop comes to be used as feed stuff, once a big bale is broken open from its ties it is somewhat inconvenient to store, to manage, and to handle.

Accordingly, it will be seen that there is a need for a baling machine which gives the advantages of the small bale while retaining the advantages of the big bale.

According to a first aspect of the invention, there is provided an apparatus for forming baleable material such as hay, straw, grass or a like above-ground crop, into a securely-strapped or banded bale of large volume which includes simultaneously securing with bands smaller-volume bales, the latter in the total making up the large volume bale.

According to a further aspect of the invention, there is provided a baling machine which includes a container having a throat entry zone for the crop to be baled and a packing mechanism for urging the crop to the throat and so into the container, a means for dispensing at least one first band intended to embrace the whole contents of the container, means for fastening the or each first band into an endless loop, means for dispensing at least one second band intended to embrace a smaller bale formed by part of the contents of the container, means for fastening the or each second band into an endless loop, a first travelling gripper means for carrying the or each first band across the entry zone, a second travelling gripper means for carrying the or each second band across the entry zone, and a control device for initiating operation of the second travelling gripper means at chosen intervals.

According to yet another aspect of the invention, there is provided a large volume bale of hay, straw, grass or a like above-ground crop characterised in that it consists of a plurality of smaller-volume bales which are all individually securely banded and are additionally banded together to form the large volume bale, the banding consisting of synthetic plastics tapes fastened by heat sealing or the application of a clamping or crimping fastener.

The invention will be best understood considered as an improvement on an existing baling machine of the type described in the aforementioned U.S. Pat. No. 3,552,109, and manufactured and sold by Howard Rotavator Limited, and such a machine has a rectangular container, about eight feet long, about five feet tall, and about five feet wide. This container has an entry throat at its front lower corner, approached by an upward sloping support formed by a number of parallel strips. Rotary packing fingers are disposed to operate in the region of this throat entry zone, and these are operated by a known mechanism which causes the ends of the fingers to move rearwardly and upwardly in an arcuate path and then withdraw by the fingers moving bodily forwardly of the machine when the fingers are approximately horizontal. It will be understood that the front wall of the container if formed by a number of adjacent vertical slats with spaces therebetween, the spaces allowing passage of the fingers. The front wall may be fixed or reciprocating. A reciprocating front wall type of arrangement can be seen by reference to the packing plate 6 and its driving mechanism in the aforementioned U.S. Pat. No. 3,552,109. This machine is capable of forming a big bale, and for this purpose suitable tying filaments are caused to extend across the throat entry and as the crop is packed into the container it pushes the tying filaments towards the walls of the container so that they embrace all the crop in the container. At this point, the free ends of the tying filaments are brought up to respective knotting machines which tie the respective free ends of the filaments to a portion of each filament passing through the knotting machine. In this way, a series of individual endless loops embrace the bale, each loop being disposed in a generally vertical plane. Problems have been encountered with the knotting machines.

In accordance with the present invention, such problems are largely if not completely overcome by utilising the concept of arranging for the contents of the container to be simultaneously baled into smaller bales utilising one or more second bands. Such bands may for example be of synthetic plastics material, heat sealed or crimped or clamped together, thereby avoiding the problems associated with knotting devices.

Further features of the invention will appear from the following description of an illustrative embodiment thereof, given by way of example and not of limitation with reference to the accompanying drawings, in which:

FIG. 3 is a front end elevation showing the packer plate which constitutes the front wall of the container and is in fact made up of a number of parallel slats part of each of which is vertical;

FIG. 4 is a front end view on a larger scale showing one of the travelling gripper means looking in the direction A in FIG. 1;

FIG. 5 is a diagrammatic perspective view of a "big bale" namely the baled product;

FIG. 6 shows (in diagrammatic side elevation) an arrangement for taking an end of a band from one (the lower) side of the entry throat to a travelling gripper;

Figure 1:
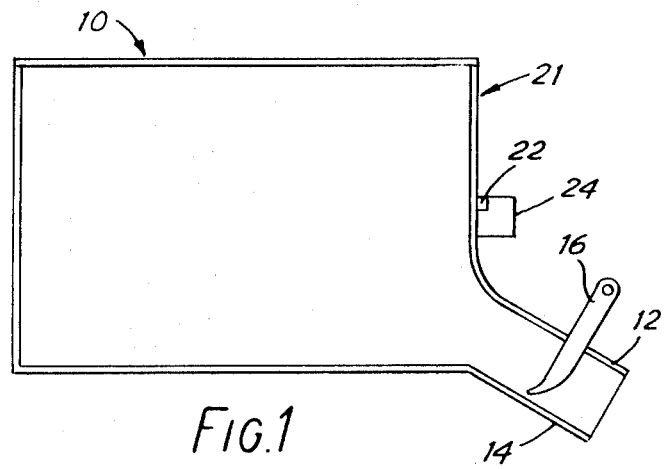
FIG. 1 is a diagrammatic cross-sectional view seen in vertical section of part of a baling machine according to one embodiment of the invention showing a packer finger, the throat entry zone, and a container.

FIGS. 12-15 also show stages in the operation of a machine according to the invention, with particular reference to the manipulation of the tape or band; and FIGS. 16 and 17 are diagrammatic side elevations of a heat seal device on an enlarged scale, illustrating the achievement of a lap weld.

The illustrated baling machine is of the type disclosed in the aforementioned U.S. Pat. No. 3,552,109 and includes a container 10 of generally rectangular shape whose walls are preferably slatted to allow air to circulate throughout the reaped crop. As illustrated, the lower front edge of the container is open to form a throat entry zone which is defined by guides 12 and 14. Baleable material is fed through the guides 12 and 14 in a known manner, as described in the aforementioned U.S. Pat. No. 3,552,109, by tines on a rotatable pickup reel which lifts material from the ground and feeds same through the entry throat. The guides 12 are formed by the lower ends of slats 20. The machine includes a plurality of packing of fingers 16, parallel to one another and spaced laterally of the machine, all of which are connected together by a drive shaft 17 (FIG. 2) to follow a rotary path so that their free ends sweep through the throat entry zone. The fingers 16 are driven by a mechanism which withdraws them generally horizontally and forwardly when the fingers reach approximately a horizontal position. (See British Pat. No. 1,244,302). The fingers pass between spaces 18 (FIG. 2) between slats 20 which together form a packing plate 21 (FIG. 3). This forms the front wall of the container 10 the opposite rear wall being an openable hinged tailgate through which bales are discharged from the container as described in the aforementioned U.S. Pat. No. 3,552,109. In the invention, it is preferred that the filaments which band the small bales and the big bale together are bands of synthetic plastics material, and a transverse beam 22 extending across the front packing plate carries a series of plastics heat sealing devices, divided into two sets. The first set of devices are for heat sealing the bands which embrace the big bale and are indicated by reference numeral 24 whereas the second set of devices are for heat sealing the bands which embrace the small bales and these are indicated by reference numeral 26 in FIG. 3.

The machine includes, in the illustrated embodiment, five separate reels of banding tape, three of these reels (27, see FIG. 8) providing tape for banding the exterior of the big bale and two of these reels (29, FIG. 8) providing tape for banding the individual small bales which together make up the big bale. Tape is fed from these reels through the respective heat seal devices 24, 26 and generally vertically across the throat entry zone to respective temporary anchor points below the throat at the start of operations. A band carrying mechanism is provided to carry the previously anchored end of each band upwardly across the throat entry zone at an appropriate time in the operating cycle. A part of the band carrying mechanism is shown in FIG. 6; its operation will be described with reference to FIGS. 12-17. It is omitted from FIGS. 7 to 11 to avoid confusion. As shown in FIG. 6, the band carrying mechanism includes a pivoted swingable arm 100, mounted with one end just below the guides 14, and pivotable in a vertical plane by a drive unit not shown, about a pivot axis 102. The free end of the arm carries a means 104 for receiving and carrying a travelling gripper and this can be associated with an actuating mechanism 106 which conditions the means 104 for receiving the travelling tape gripper from the guides 12 on the retracting stroke of the fingers 16, and which conditions the means 104 for releasing the travelling tape carrier onto the guides 12 on the forward stroke of the fingers. A band or tie is seen at 108 and it extends from the heat seal device 24 downwardly across the throat entry zone between the guides 12 and 14 to the means 104, which in this instance serve as an anchor point. There is one arm 100 for each band. The function of each of the arms 100 is to carry the end of the associated band downwardly and then upwardly across the throat entry zone from and to a point 110. Each band is gripped by a travelling gripper, which is driven downwardly and upwardly along a path from the point 110 just above the throat entry zone to the associated heat sealing device 24 or 26 as the case may be. Each of the travelling grippers seen in FIG. 4, consists of a yoke 30 having rollers 32 which run in appropriate channel shaped tracks (33, FIG. 4) disposed on facing opposed edges of each adjacent pair of the vertical slats 20. The yoke 30 carries a pair of opening and shutting gripper clamps 34 which in use, grip the free end of a banding tape and release it at an appropriate time in the cycle as will be explained with reference to FIGS. 12-17. The opening and shutting of the gripper clamps 34 and the oscillating movement and gripping and ungripping movement of the travelling grippers are both controlled by an appropriate timing device actuated by rotation of the main shaft 36 (FIG. 1) which drives the packing fingers 16. In FIG. 4, a band is seen at 108.

Figure 12:
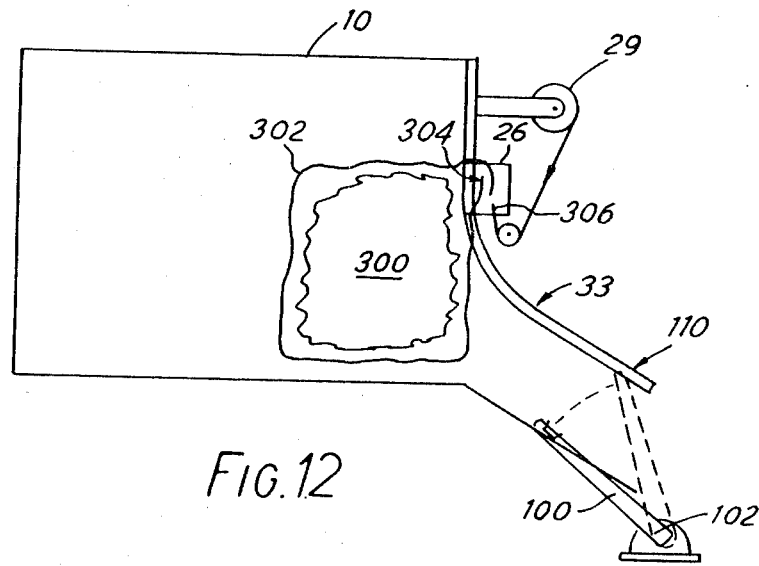

FIGS. 12-16 illustrate one sequence of operations in one example of a baling machine in accordance with the invention. FIGS. 12-16 are diagrammatic in nature, and parts of the machine have been omitted. The bale chamber is shown at 10, with the arm 100 pivotally mounted for swinging movement in the manner illustrated in FIG. 6. A reel of synthetic plastics tape which can be secured to itself in a lap weld by heat welding is carried on a spool 29. It will be appreciated that the machine has other spools 27 and 29 as described with reference to FIGS. 5-9. Only one spool 29 is shown in FIGS. 12 to 16 and only one tape will be described for the purpose of simplifying the description. The other tapes are dealt with in a similar manner. The tape from spool 29 passes through the heat sealing device 26, and at a convenient point which can be regarded as the start of the operating cycle has a free end secured to the travelling gripper clamps 34 (FIG. 4) which run in the channel 33. Each travelling gripper is connected by a wire strop or other connecting member passing through the arm 100 at the point 104 to a spring tensioner mounted beneath the floor of the bale chamber 10 and behind the arm 100. As the finger 16 retracts and returns to its starting position (in known manner) the wire strop pulls the travelling gripper attached thereto down the track 33 to the point 110. The tape is thus pulled out from the spool 29 until the travelling gripper clamps 34 reach the point 110 (FIG. 6 or FIG. 12). The track 33 at this point has part of its lower wall cut away and has a guide whereby the travelling gripper is caused to move into the receiving means or holder 104 on the end of the swinging arm 100. During the downward movement of the travelling gripper along the track 33, it is engaged by a rack or pegs (not shown) which causes the gripper clamps 34 to be rotated about a horizontal axis through substantially 360° in an anticlockwise direction as seen in the drawing. The purpose of this 360° rotation will be seen from FIGS. 12-16. Other means of achieving the rotation could be employed; for example a smaller motor could be mounted on the travelling gripper and actuated to effect the rotation by a suitable trigger mechanism.

Referring now to FIG. 12 there is diagrammatically shown the container 10 within which is a small bale 300 which has just been banded by a band 302 heat sealed to itself by a lap-weld at 304 in the heat seal device 26. The band has just been cut by a conventional cutter in the heat seal device 26 and the new free end is seen at 306.

Figure 13:
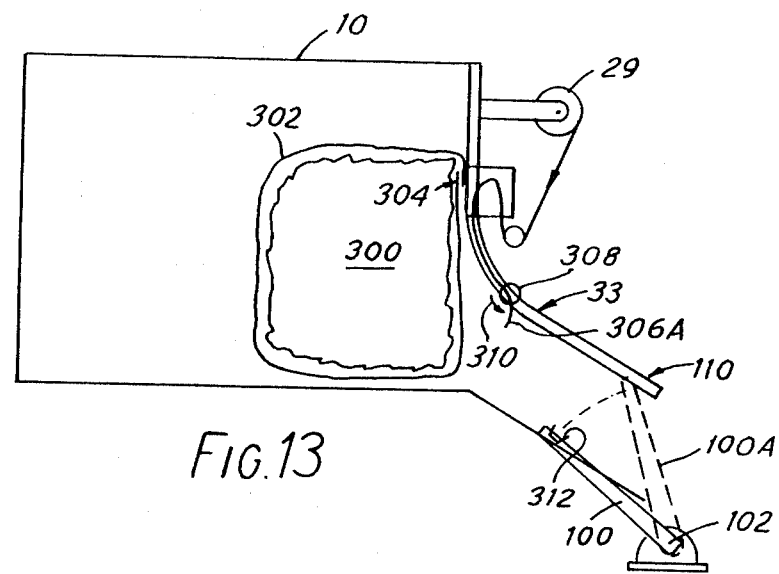

The travelling gripper is not shown in FIG. 12 but it is diagrammatically indicated at 308 in FIG. 13. The mechanism whereby the gripper takes control of the new free end 306 after having delivered a previously-free end to the heat sealer is analagous to the mechanism in a conventional knotting device and will be understood by a man skilled in the art without further description.

Figure 14:
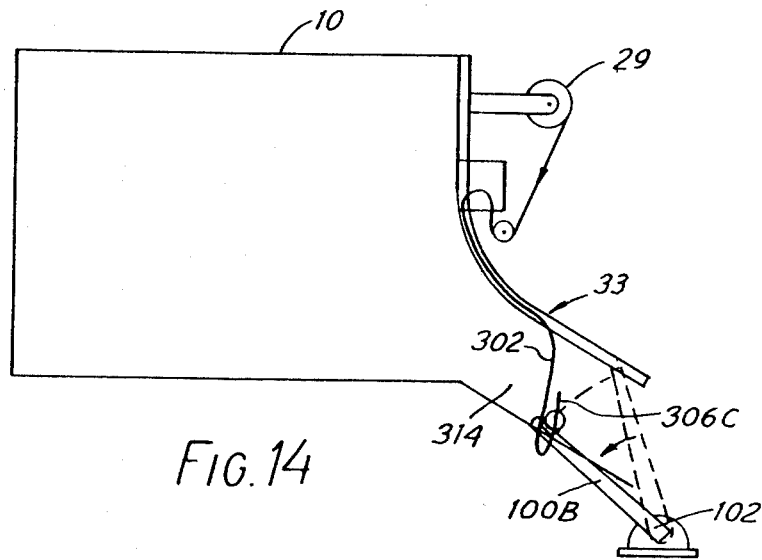
Figure 15:
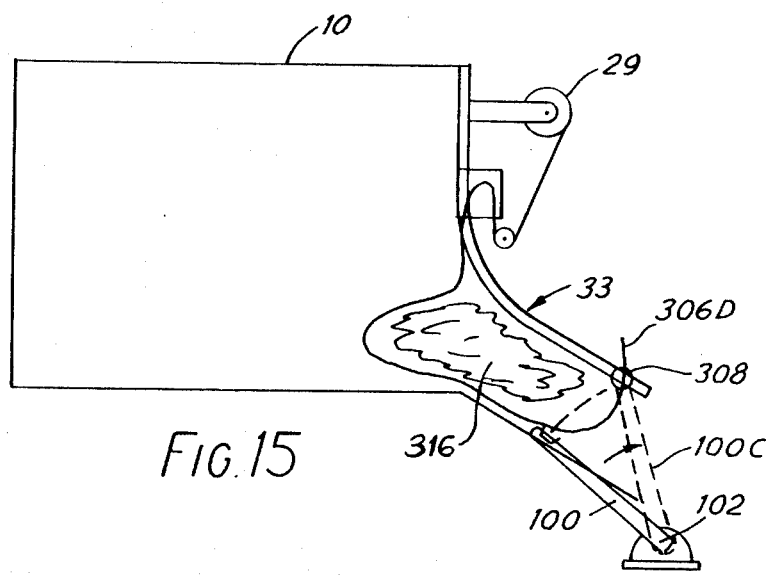

The gripper 308 is pulled downwardly along the track 33 by the wire strop (not shown) attached thereto as the packing fingers 16 are withdrawn. During this movement the gripper 308 is rotated (anticlockwise as seen in the drawing) so that the free end 306, initially pointing substantially vertically upwardly as seen in FIG. 12, points downwardly as seen at 306A in FIG. 13. The rotation direction is shown by the arrow 310 in FIG. 13. As the gripper 308 continues its movement to the point 110, it continues to be rotated by the rack or pegs (not shown) disposed along the track 33, and when it reaches point 110 the free end of the band is pointing substantially vertically upwardly in a manner analagous to that shown at 306D in FIG. 15. When the gripper 308 reaches the point 110 as described, it is no longer constrained in the channel track 33 and is guided to leave it and enter a holder 312 disposed at the free end of the swinging arm 100. At this point in the cycle of operations the arm 100 is in its position 100A as seen in FIG. 13 and so is correctly placed to receive the gripper 308. The arm 100 then carries out a swinging movement in which it first carries the free end of the band down across the throat entry zone 314 as shown in FIG. 14 so that the band 302 is correctly positioned as shown in FIG. 14 ready to bind the next swath of crop, seen at 316 in FIG. 15, which is pushed or packed into the throat entry zone by the packing fingers 16 (see FIG. 6; not shown in FIGS. 12–15). When the desired amount of crop has been packed in, the arm 100 swings upwardly carrying the free end 306 of the band upwardly across the entry throat as shown in FIG. 15, wherein the free end of the band is shown at 306D, projecting generally vertically upwardly. This orientation is important because it is required in order to achieve a lap weld as will shortly be more fully understood. The gripper 308 is at this time released from the holder on the arm 100 and is guided to re-enter the track 33, and the packer fingers 16 push the gripper 308 back up towards the heat seal device 26 in the way described with reference to FIG. 6. At the end of this movement, as seen in FIG. 16, the free end 306E of the band occupies a position adjacent to another length 302A of the band within the heat seal device 26, ready for a lap weld to be made sealing them together. The next stage is shown in FIG. 17, wherein the lap weld 304 securely joins the lengths 306E and 302A and so securely binds the swath of crop. FIG. 17 shows the position after a cut has been made, in conventional manner within the heat seal device, to produce a new free end 306F. This is then gripped by the travelling gripper clamps 34 and the cycle of operations described are then repeated.

If desired, a bell mouth or other guide (not shown) may be provided on the heat sealing device 26 to ensure that the band free end 306E enters it without difficulty. The lap weld operation is then carried out in a manner known per se.

In FIGS. 12–15 the detail of the free end of arm 100 is not shown, but this may be of any suitable construction and may include a spring detent or the like to hold the travelling gripper 308 in the holder 312. It will be remembered that in FIGS. 3 and 5 it was made clear that there are three separate bands for securing the big bale and two bands for securing the small bale. While only one arm 100 has been referred to, it will be understood that there is one arm 100 for each band, that is to say five such arms are spaced laterally across the machine, each one co-operating with one track 33.

It will be seen from the foregoing description that the free end of the band or tape is rotated through approximately 360 degrees in the period when it (the band) is pulled from the heat seal device, carried downwardly across the throat 314, around the big or small bale as the case may be, and then carried upwardly across the throat and back to the heat seal device. This rotation is necessary to ensure that the free end and the continuous length of the band passing through the heat seal device are overlapped so that they can be lap welded in the optimum way (FIGS. 16 and 17) to resist the tensioning force which is applied to the band or tape when a strapped bale is lifted or shifted. In the procedure described with reference to FIGS. 12–17, the rotation of the free end of the band is achieved by rotating the gripper clamps 34 about a generally horizontal axis.

Figure 2:
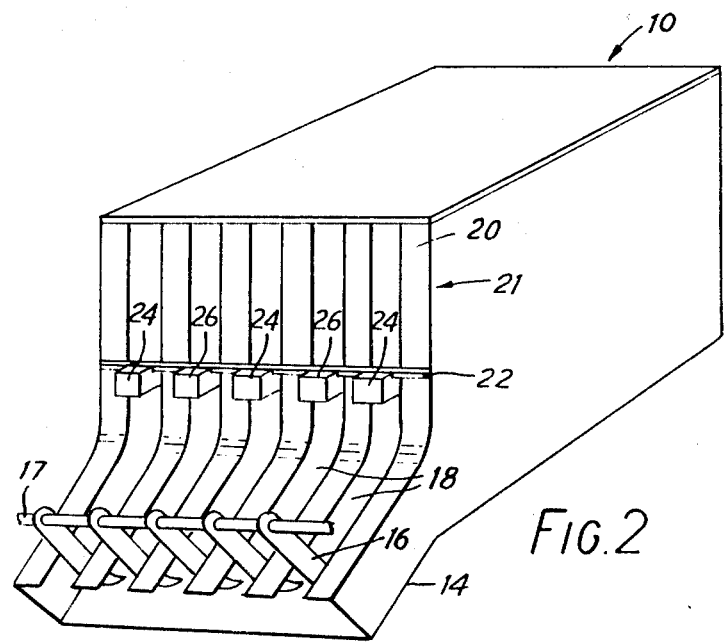
FIG. 2 is a perspective view looking at the front (throat entry) end of the container of FIG. 1.
Figure 7:
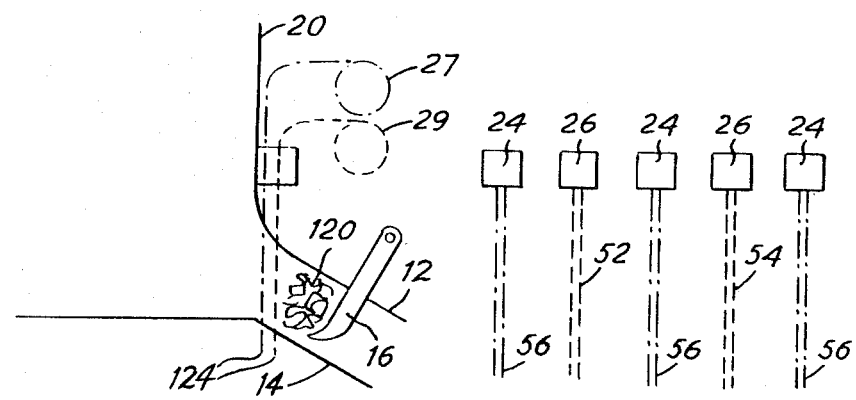
FIGS. 7-11 show stages in the formation of a big bale in accordance with the present invention, in a diagrammatic manner.
Figure 8:
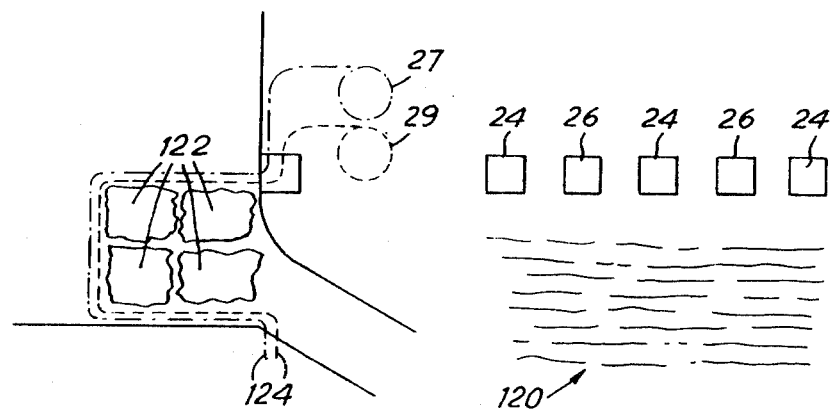
Figure 9:
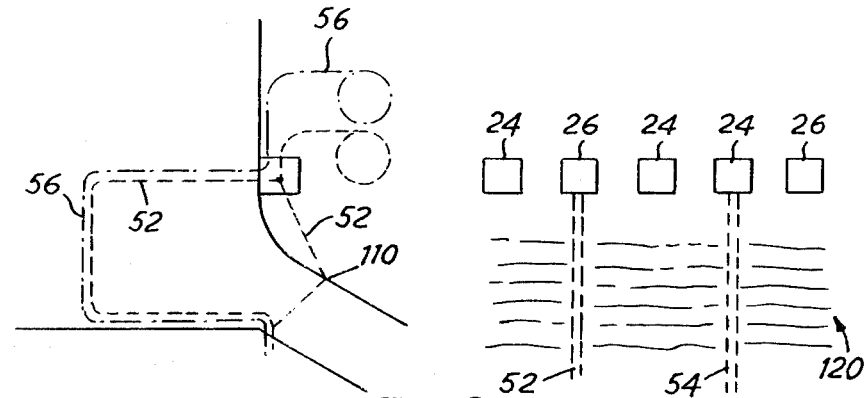
Figure 10:
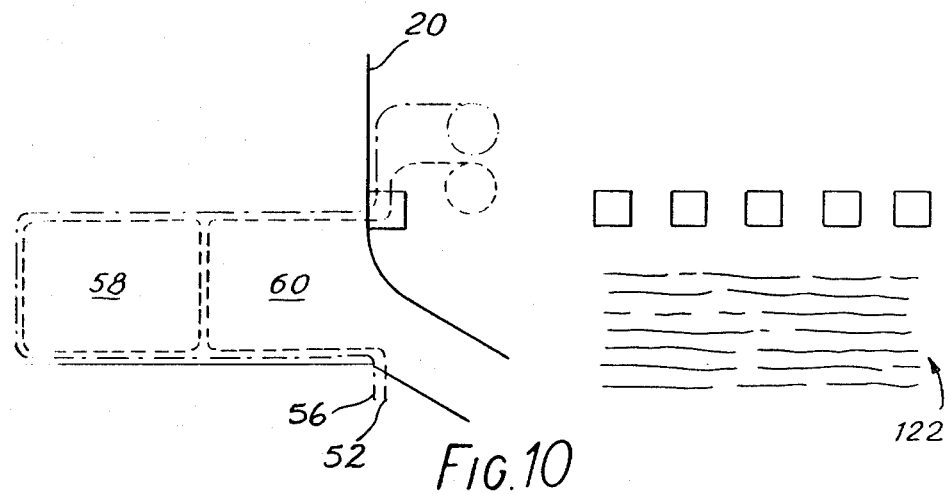
Figure 11:
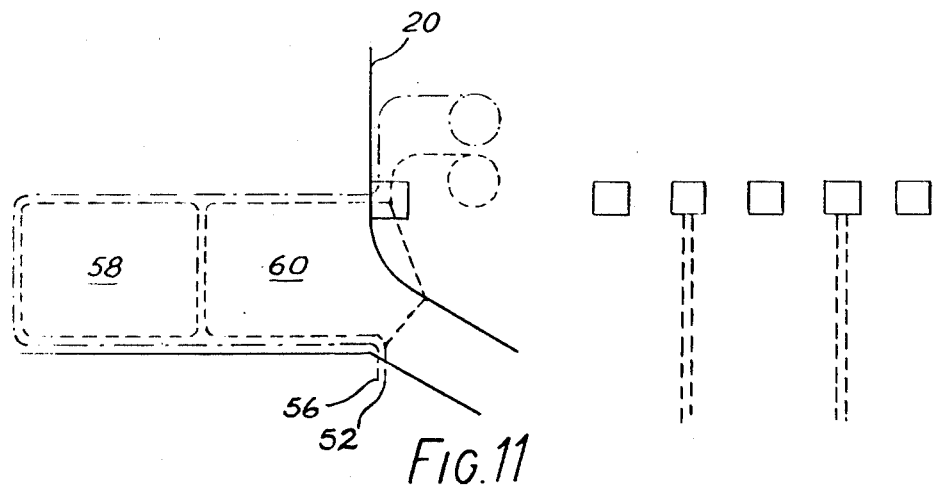

The stages in operation of the machine and method forming the big and small bales according to the present invention can be seen from FIGS. 6–11. In FIGS. 7–11 the left-hand half of each Figure is a diagrammatic side view and the right-hand half is an end view showing only the heat seal devices and the bands. FIG. 7 shows diagrammatically only two reels of banding tape, but in fact five reels spaced across the machine will be provided, three of which dispense tape for banding the big bale as described above, and two of which dispense tape for banding the small bales. Five heat seal devices 24, 26 are located at spaced positions across the width of the machine carried by a beam 22 (FIG. 6) across the packing plate 21 (FIG. 2). FIG. 7 shows the situation when the container is empty and the packing fingers 16 are pushing a swath 120 of out crop up the guide 14 and into the throat entry zone. Extending vertically across this zone at this time are five bands 52, 54, 56, as seen at the right hand part of FIG. 7. The free ends 124 of the bands extend across the throat entry zone. FIG. 8 shows the situation when a predetermined number of swaths 122 (four in this example) which together form a small bale have been fed into the container. The five bands have been forced by the entering crop to take up approximately the position seen in FIG. 8, then two of the five band carrying arms 100 are actuated together and swing clockwise (as seen in FIG. 6) thereby carrying the said free ends of the bands 52, 54 across the throat entry zone to point 110, and the travelling grippers return into the track 33.The two grippers carrying the "small bale" bands are then urged upwardly along their tracks by the two associated fingers 16, until they reach the heat seal devices 26. The two travelling grippers associated with the small bale bands, i.e. bands 52 and 54 in FIG. 7, have thus been operated to grip and draw the two small bale bands upwardly across the throat entry zone and up the path defined by channels 33 as seen in FIGS. 4 and 12–17. The small bale band ends are thus transported to the heat seal device, having been properly oriented as described with reference to FIGS. 12–17. As has been described, an intermediate part of a band passes through each heat seal device 24 or 26 as the case may be, and when the travelling grippers bring the ends 124 (FIG. 8) of the bands 52 and 54 to their associated heat seal devices 26, the said devices operate to lap weld the free ends to the intermediate part and so make two laterally-spaced closed loops each encircling the same small bale. Each band 52, 54 is then cut at a point slightly away from the joint and the new free end is gripped by the associated travelling gripper and pulled down generally vertically. It is then carried down through the throat entry zone by the arm 100. This occurs for both the bands 52 and 54, and one has the situation seen at the right-hand side of FIG. 9 where two bands are ready to receive and be forced inwardly by the next swath and succeeding swaths which together will form the next small bale. This next small bale is shown partly formed at FIG. 10. In FIG. 10 the first small bale is seen at 58 and the not yet banded second small bale is seen at 60. The banding for the big bale is seen at 56 and, as will be understood by inspection of FIG. 5, this banding, which is effected using bands 56, is not closed to endless loops until the whole container 10 is filled. FIG. 11 shows the situation after a repeat of the operation of FIG. 9 wherein the bands embracing the second small bale 60 have firstly been pulled upwardly across the throat entry zone and sealed to an intermediate part of each such band, and thereupon the new free ends are pulled downwardly by the travelling gripper means across the throat entry zone. Hence they are ready to receive swaths which will be combined to form the third small bale. These operations are repeated until the whole container 10 is full, whereupon the bands 56 are closed to form endless loops in a similar manner.

It will be seen that the present invention has the advantage that small bales of manageable size are simultaneously formed and securely banded with the formation of a similarly securely-banded big bale whose handling can be swiftly and economically effected by suitable mechanised handling apparatus. In addition, the complexities associated with prior known knotting machines are avoided, a secure lap weld can be achieved, and the basic advantages of this type of machine, namely fast baling and secure banding so leading to storage of the bales under good conditions, are retained.

In a preferred embodiment of the invention, the length of band pulled out is monitored and is metered, and when a predetermined length has been pulled off the spool, a triggering mechanism is actuated. Actuation of the triggering mechanism causes the swinging arm 100 to start its upward swing carrying the travelling gripper, which thereafter continues its movement and passes up the track 33 and takes the band free end into the heat seal device. In this way, the size of the "small bale" can be adjusted as desired. The running out of the tape or band can be sensed in any covenient way, for example by arranging that it drives a rotatable pulley wheel, whose rotation through one or more complete revolutions is arranged to actuate an electrical, mechanical, hydraulic or pneumatic-trigger mechanism.

What is claimed is:

1. In a baling apparatus of the type including a large generally rectangular container into which baleable material is fed to fill the container and form a large bale which is encircled by large bale ties for sustaining the large bale, the improvement comprising: means for encircling small bunches of said baleable material with small bale ties as said material is fed into said container to successively form a plurality of individual self-sustaining small bales substantially smaller in size than said large bale, whereby removal of the large bale ties produces a plurality of self-sustaining small bales instead of a mass of loose material.

2. The baling apparatus as defined in claim 1 wherein said container includes an entry throat and an intermittently operable packing mechanism for moving material from said entry throat into said container in the form of small swaths, and said means for encircling bunches of said material with small bale ties being operable for encircling a plurality of said swaths.

3. The baling apparatus as defined in claim 1 wherein said container has an entry throat and said means for encircling each said small bale with small bale ties includes small bale tie supply means for extending small bale ties across said throat to partially surround each said small bale as it is formed.

4. Baling apparatus comprising: a large generally rectangular container having an entry throat, means for feeding baleable material from said entry throat into said container, means for encircling small bunches of said baleable material with small bale ties as said material is fed into said container to successively form a plurality of small bales, and means for encircling all of said small bales in said container with large bale ties to form a large self-sustaining bale made up of a plurality of self-sustaining small bales.

5. The baling apparatus as defined in claim 4 wherein said means for encircling said small bales with small bale ties includes means for supplying small bale ties of synthetic plastic material and for heat sealing loops of same together in encircling relationship to a small bale.

* * * * *